Aug. 8, 1939.　　　　G. A. LYON　　　　2,168,356
SNAP-ON BUMPER GUARD
Filed Oct. 20, 1937
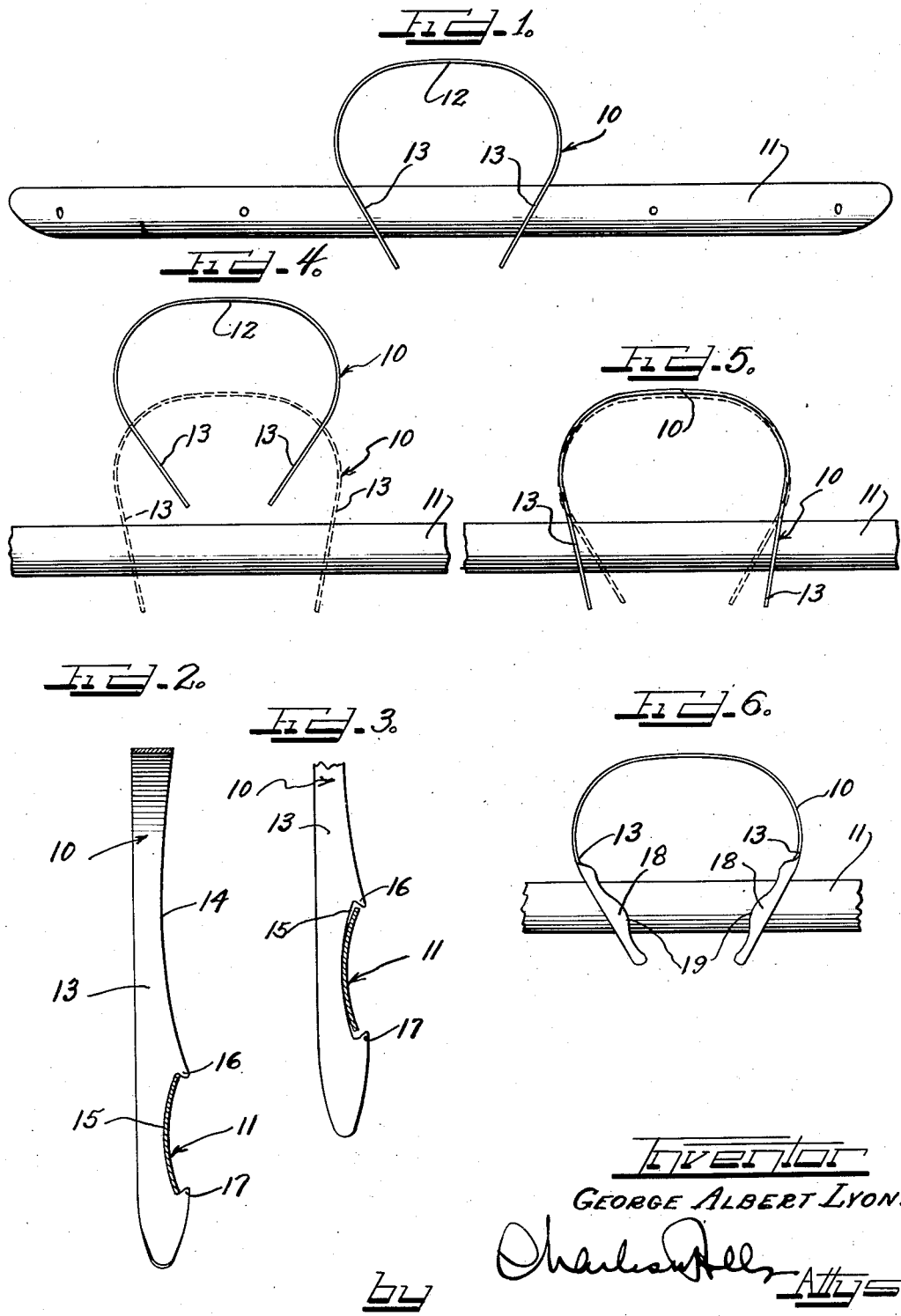
Inventor
GEORGE ALBERT LYON.

Patented Aug. 8, 1939

2,168,356

UNITED STATES PATENT OFFICE 2,168,356

SNAP-ON BUMPER GUARD

George Albert Lyon, Allenhurst, N. J.

Application October 20, 1937, Serial No. 170,033

6 Claims. (Cl. 293—55)

This invention relates to a snap-on ornamental bumper guard or impact member, and more particularly to an ornamental bumper accessory which is adapted to be snapped into desired position on a vehicle bumper to increase the protection afforded by the latter.

The ordinary motor vehicle of the present day is provided with a front and rear impact member which is commonly known as a "bumper". These impact members or bumpers afford a substantial measure of protection to the front and rear of the motor vehicle, but it has been found that in many instances a collision or accident occurs in which some obstacle extends over the top of the impact member or bumper and damages a portion of the car. It has been found to be particularly true with respect to the front impact member or bumper. In view of the fact that many motor vehicles of the present day are provided with an ornamental cast grille radiator front which is relatively expensive to manufacture and costly to replace, it has been found in many instances to provide an auxiliary impact member on the front bumper. For such an auxiliary impact member to be commercially satisfactory, it is desirable that it be constructed in such a manner that it will withstand any ordinary shock or collision, and it must also be capable of being readily and quickly mounted on the bumper.

It is an object of this invention to provide a novel impact member possessing the above highly desirable characteristics.

Another object of this invention is to provide a novel auxiliary impact member to be mounted on the usual form of vehicle bumper which is economical to manufacture and which is rugged and reliable in use.

A further object of this invention is to provide a novel snap-on impact member for vehicle bumpers.

Another and further object of this invention is to provide a novel snap-on ornamental grille or bumper guard and a novel method and means for mounting the same on a vehicle bumper.

Another and still further object of this invention is to provide a novel auxiliary impact member having converging leg portions which extends into detachable engagement with a vehicle bumper and which is held in desired position by its own resiliency.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a front elevational view of a snap-on ornamental grille guard or impact member mounted on a vehicle bumper;

Figure 2 is a side elevational view partly in cross section of the ornamental grille guard and bumper of Figure 1, showing the means by which the grille guard is mounted on the bumper;

Figure 3 is a side elevational view partly in cross section of the ornamental grille guard and bumper of Figures 1 and 2 showing the relative position of the two members as they are being assembled one on the other;

Figures 4 and 5 illustrate the manner in which the grille guard is mounted on the vehicle bumper; and Figure 6 is a front elevational view of a modified form of ornamental grille guard mounted on a vehicle bumper.

In Figures 1 to 5 of the drawing, an embodiment of this invention is illustrated which includes an inverted bow shape impact member 10. The impact member 10 is formed of spring steel, cold rolled steel, or other suitable material which is of substantially inverted bow shape having a central bow shaped portion 12 and converging leg portions 13 which extend across the front face of bumper 11. The width of the material near the upper end of the leg portions 13 is preferably slightly less than the thickness of the remaining portion of the impact member as is indicated at 14 in Figure 2, in order to render the member 10 more flexible at these points, for a reason which will presently appear. This does not detract from the impact resisting properties of the member 10, since the minimum width is sufficiently great to withstand all ordinary shocks of collision.

The impact member 10 is secured to the bumper 11 by cutting out or shaping the lower rear edges of the legs 13 in such a manner that the legs 13 will intimately overlie the front face of the bumper 11 when the member 10 has been mounted in desired position thereon. This portion of each leg 13 which intimately overlies the front face of bumper 11 is designated by the reference numeral 15. At opposite ends of portion 15 of each leg 13 an obliquely downwardly extending tooth 16 and an obliquely upwardly extending tooth 17 are provided. As may be seen best in Figure 2 of the drawing, teeth 16 and 17 of the legs 13 extend behind and engage with the bumper 11 to secure the impact member 10 in desired position on the bumper 11.

As will be observed from a cursory inspection of Figure 3 of the drawing, complementary teeth 16 and 17 of each leg 13 are spaced so that the minimum distance between each tooth 16 and its complementary tooth 17 is greater than the vertical width of the bumper 11. The impact member 10 is retained in desired position on bumper 11 by virtue of the fact that the vertical distance between each tooth 16 and its complementary tooth 17 is less than the vertical width dimension of bumper 11 when the legs 13 are disposed at an angle to the vertical as is shown in Figure 1.

Referring now to Figures 4 and 5 of the drawing, the manner in which the teeth 16 and 17 are hooked over the bumper 11 will be described. The impact member 10 in its normal unflexed position prior to being mounted on bumper 11 is of the shape shown by the full lines in Figure 4 and by the dotted lines in Figure 5. It is to be noted that the legs 13 of the member 10 in their unflexed position converge at an angle greater than that maintained by the legs 13 in their mounted position, as shown in Figure 1.

To mount the impact member 10 on bumper 11, the legs 13 are sprung outwardly until they have assumed approximately the position shown by the dotted lines in Figure 4 and the full lines in Figure 5. In this position the vertical distance between each pair of complementary teeth 16 and 17 is greater than the vertical width dimension of bumper 11. While the impact member 10 is held in this position, it is moved against the front face of bumper 11 as shown in Figure 3. The legs 13 of the impact member 10 are then permitted to flex inwardly until they have assumed the position indicated by the dotted lines in Figure 5 and by the full lines in Figure 1. This position is, of course, determined by the distance apart of each pair of complementary teeth 16 and 17. The legs 13 of impact member 10 will tend to move together until the vertical distance between each pair of complementary teeth 16 and 17 at their base is the same as the vertical width dimension of bumper 11. The auxiliary member or guard 10 will now remain in desired position on bumper 11 until the legs 13 are again flexed outwardly, at which time the impact member 10 may be removed from the bumper 11.

As will readily be understood by those skilled in the art, it is not necessary in order to carry out the cardinal features of the present invention to thin out the material of the member as at 14. This thinning out of the material of the impact member 10, however, greatly facilitates the flexing of the legs 13 without detracting appreciably from the impact characteristics of the member.

In Figure 6 of the drawing, a modified form of the invention is shown, in which the legs 13 of the impact member 10 are formed with an ornamental flange 18 thereon extending in a plane substantially parallel to the front face of bumper 11. Flanges 18 may assume any desired configuration which is pleasing to the eye and which will enhance the general appearance of the impact member 10. As shown in Figure 6, flanges 18 extend inwardly from main leg portions 13 and are provided with an ornamental inner edge 19.

From the above description of the embodiments of my invention illustrated in Figures 1 to 6 in the drawing, it will be seen that I have provided an extraordinarily simple and yet effective auxiliary impact member or snap-on ornamental grille or bumper guard which may be economically manufactured, readily and quickly mounted by an unskilled person on a vehicle bumper, and which is rugged and reliable in use.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. As an article of manufacture for vehicle bumpers, an auxiliary impact member formed of cold-rolled strip steel stock comprising a single bow-shaped member having downwardly converging legs, each of said legs having a pair of complementary teeth thereon extending around the upper and lower edges of a vehicle bumper for securing said member thereto.

2. As an article of manufacture for vehicle bumpers, an auxiliary impact member formed of cold-rolled strip steel stock comprising a single bow-shaped member having downwardly converging legs, each of said legs having an attaching means thereon including an obliquely downwardly extending tooth, and an obliquely upwardly extending tooth, the minimum distance between said teeth being greater than the width of the bumper to which said accessory is to be attached, said teeth being adapted to hook over and under a vehicle bumper and to constitute the sole attaching means for securing said member thereto.

3. As an article of manufacture for vehicle bumpers, an accessory adapted to increase the protection afforded by a bumper comprising a single bow-shaped member formed of cold-rolled strip steel stock having downwardly converging legs, each of said legs having means thereon for detachably securing said accessory to a vehicle bumper, intermediate portions of said accessory being reduced in thickness to permit flexing thereof.

4. As an article of manufacture for vehicle bumpers, an auxiliary impact member comprising a single bow-shaped member having downwardly converging legs formed of substantially flat strip stock, said legs having means thereon for detachably securing said member to a vehicle bumper, the thickness dimension of said stock being in a plane parallel to the front face of said bumper and the width dimension of said stock being at right angles to the plane of the front face of said bumper, the edge of each leg of said impact member being shaped to intimately overlie and engage the front face of said bumper.

5. As an article of manufacture for vehicle bumpers, an auxiliary impact member including legs extending downwardly into engagement with a vehicle bumper, means on said legs for detachably securing said member to said bumper, and a reinforcing flange on said auxiliary impact member extending in a plane parallel to the front face of said bumper.

6. As an article of manufacture a bumper guard comprising a vertical member formed of strip steel stock adapted to extend above and below a bumper bar for the purpose of preventing the bumpers from interlocking therewith, said member being resiliently expansible for application to the bar and being thereafter automatically contractible into resilient retaining engagement with the bar.

GEORGE ALBERT LYON.